United States Patent [19]

Millman

[11] Patent Number: 5,363,204
[45] Date of Patent: Nov. 8, 1994

[54] FACSIMILE MACHINE HAVING USER HELP CAPABILITY

[75] Inventor: Mark E. Millman, Bayville, N.J.

[73] Assignee: AT&T Bell Laboratories, Murray Hill, N.J.

[21] Appl. No.: 919,072

[22] Filed: Jul. 23, 1992

Related U.S. Application Data

[63] Continuation of Ser. No. 495,196, Mar. 19, 1990, abandoned.

[51] Int. Cl.[5] ............................................. H04N 1/00
[52] U.S. Cl. .................................. 358/406; 358/444; 358/434; 358/400
[58] Field of Search ............... 358/400, 401, 403, 404, 358/405, 406, 444, 437, 434, 435, 436, 438, 440; 355/202, 203, 204, 205

[56] References Cited

U.S. PATENT DOCUMENTS

| | | | |
|---|---|---|---|
| 2,642,492 | 6/1953 | Hammond, Jr. | 358/479 |
| 4,587,633 | 5/1986 | Wang et al. | 358/403 |
| 4,648,062 | 3/1987 | Johnson et al. | 364/900 |
| 4,774,590 | 9/1988 | Haganuma et al. | 358/401 |
| 4,896,223 | 1/1990 | Todome | 358/468 |
| 4,937,762 | 6/1990 | Todome | 358/468 |
| 4,965,676 | 10/1990 | Ejiri et al. | 358/406 |
| 5,072,309 | 12/1991 | Brown | 358/403 |
| 5,105,284 | 4/1992 | Sakata et al. | 358/404 |

OTHER PUBLICATIONS

"The Complete FAX/9600", User's Guide, Version 2.1 The Complete PC, Inc. pp. 1-15.

*Primary Examiner*—Edward L. Coles, Sr.
*Assistant Examiner*—Fan Lee
*Attorney, Agent, or Firm*—John A. Caccuro

[57] ABSTRACT

A facsimile machine includes a help feature for providing the user with a hard copy of "help" information, outputted via the facsimile printer, relevant to the existing operating mode of facsimile machine at the time the help feature was activated. If the help feature is activated when the facsimile machine is in a standby mode, the user is prompted to request a menu or to select the type of help information to be outputted in facsimile form. If the help feature is activated when the facsimile machine is in an active operating mode, (e.g., programming, service or error modes), the outputted help information is selected by the facsimile machine based on machine sensor status and/or the present software state. The help feature is activated by a predesignated push button or access code.

20 Claims, 8 Drawing Sheets

FIG. 3
HELP MENU

| ACCESS CODE (301) | PROGRAMMING MODE | CONDITION (302) |
|---|---|---|
| 01 | INFO ON PROGRAMMING PROCEDURES | SOFTWARE STATE (SW) |
| 02 | POLLING | |
| 03 | POLLING RECEPTION | |
| 04 | POLLING-TURNAROUND POLLING | |
| 05 | POLLING-POLLING FILES | |
| 06 | POLLING STANDBY | |
| 07 | POLLING CODES | |
| 10 | SETTING TIME AND DATE | |
| 11 | LIST OF FEATURE/PROGRAM CODES | |
| ... | ERROR MODE | |
| 23 | ORIGINAL DOCUMENT FEED JAM | SW AND/OR SENSOR STATES |
| 24 | COMMUNICATION ERROR | SW |
| 25 | OUT OF PAPER | SENSOR STATE |
| 26 | COVER OPEN | |
| 27 | THERMAL PAPER JAM | |
| ... | SERVICE MODE | |
| 34 | SERVICE MODE FEATURE LIST | SW (SERVICE MODE PROG.) |
| 35 | PROGRAM SYSTEM PARAMETERS | |
| 36 | SET PULSE WIDTH | |
| 37 | AUTO DIAGNOSTICS 1 | |
| 38 | AUTO DIAGNOSTICS 2 | |
| ... | COMMUNICATION MODE | |
| 40 | BASIC TRANSMISSION | |
| 41 | BASIC RECEPTION | |
| 42 | AUTO ANSWER OPERATION | SW, SENSOR STATE |
| 43 | OFF HOOK DIAL | SW, SENSOR STATE |
| 44 | REDIAL OPERATION | SW, SENSOR STATE |
| ... | MISCELLANEOUS INFORMATION | |
| 52 | PARTS LIST | N/A |
| 53 | FAX MAINTENANCE | N/A |
| 00 | HELP MENU | N/A |

| ORIGINAL DOCUMENT FEED JAM |
| :---: |
| OPEN SCANNER COVER BY PRESSING COVER BUTTON |
| • |
| • |
| REMOVE PARTIALLY FED OR JAMMED ORIGINAL DOCUMENTS |
| CLOSE SCANNER COVER |

FIG. 5

SETTING THE DATE AND TIME
ACCESS CODE 10

YOUR 9025FX MACHINE HAS AN INTERNAL CLOCK THAT DISPLAYS THE TIME ON THE LCD AND PRINTS THE DATE ON EACH PAGE YOU TRANSMIT. THE CLOCK IS ACCURATE TO ±40 SECONDS PER MONTH.

TO ADJUST THE CLOCK:

1. PRESS THE PROGRAM KEY.

2. ENTER 90 AT THE DIALPAD TO ENTER ADMIN MODE.

3. ENTER 10.
   THE DISPLAY AT THE RIGHT WILL APPEAR. YOU CAN EITHER CHANGE THE ITEM AT THE BLINKING CURSOR, OR ACCEPT THE DISPLAYED DATA.

4. TO ACCEPT THE DISPLAYED DATA AND RETURN TO READY MODE, PRESS SAVE.
   IF YOU NEED TO CHANGE THE DATA, GO ON TO STEP 5.

5. CHANGE THE TIME AT THE BLINKING CURSOR.
   TO CHANGE THE MONTH:
     PRESS # TO INCREMENT.
     PRESS * TO DECREMENT.
   EXAMPLE: TO CHANGE APRIL TO MAY, PRESS # ONE TIME.

6. TO MOVE THE CURSOR TO THE NEXT ITEM, PRESS YES.

7. TO CHANGE A NUMERICAL ITEM, PRESS THE DESIRED NUMBER ON THE DIALPAD.

8. WHEN YOU ARE SATISFIED WITH THE DISPLAY, PRESS SAVE.

9. PRESS PROGRAM TO RETURN TO STANDBY MODE.

| PROGRAM __ |
| --- |

| ADMINISTRATION __ |
| --- |

| DATE & TIME |
| --- |
| APR 14 '88 11:30 |

| DATE & TIME |
| --- |
| SAVED |

| DATE & TIME |
| --- |
| MAY 14 '88 11:30 |

| DATE & TIME |
| --- |
| MAY 14 '88 11:30 |

| DATE & TIME |
| --- |
| SAVED |

FIG. 6

CODE ACCESSED FEATURES

FEATURE CODE LIST
PRESS "FEATURE" AND CODE #'S

| CODE | FEATURE OR PROGRAM |
|---|---|
| 0 | BASIC TRANSMISSION |
| 1 | SEND LATER TRANSMISSION |
| 2 | POLLING STANDBY |
| 3 | RELAY BROADCAST REQUEST |
| 4 | CONFIDENTIAL TRANSMISSION |
| 5 | VOLUME ADJUSTMENTS |
| 6 | TRANSMISSION SPEED ADJUSTMENT |
| 10 | DATE AND TIME ADJUSTMENT |
| 11 | TTI ADMINISTRATION |
| 12 | RTI ADMINISTRATION |
| 13 | CSI ADMINISTRATION |
| 14 | TELEPHONE LINE TYPE SELECTION |
| 15 | AUTO-ANSWER DELAY |
| 16 | LOCAL TEL # SETTING |
| 20 | TTI ON/OFF |
| 21 | BATCH NUMBERING ON/OFF |
| 22 | VOICE AND FAX CALLS ON TCR |
| 23 | TRANSMISSION REPORT ON/OFF |
| 24 | FINE RESOLUTION ON/OFF IN COPY MODE |
| 25 | ERROR CORRECTION MODE ON/OFF |
| 27 | LIMITED ACCESS ON/OFF |
| 29 | SUBSTITUTE RECEPTION ON/OFF |
| 30 | OUTWARD DIALIANG RESTRICTION |
| 31 | PASSWORD REQUEST ON/OFF |
| 32 | DIALING RESTRICTION PASSWORD ADMINISTRATION |
| 34 | LIMITED ACCESS LIST PROGRAMMING |
| 40 | TCR PRINTOUT |
| 41 | TELEPHONE LIST PRINTOUT |
| 42 | KEYSTROKE PROGRAM LIST PRINTOUT |
| 43 | LIMITED ACCESS LIST PRINTOUT |
| 50 | VOICE MESSAGE ADMINISTRATION |
| 51 | PLAY BACK VOICE MESSAGE |
| 60 | POLLING LIST PRINTOUT |
| 61 | ERASE POLLING RECORD |
| 62 | POLLING ID CODE |
| 80 | ERROR CODE DISPLAY |
| 81 | COMMUNICATED PAGE COUNT DISPLAY |
| 82 | SCANNED AND PRINTED PAGE COUNTER DISPLAY |

601

BUTTON ACCESSED FEATURES
BROADCAST
POLLING
VOICE REQUEST
CONTRAST
RESOLUTION
HALFTONE
NOTIFY
AUTO ANSWER/MANUAL ANSWER
SPEED DIAL
QUICK DIAL
GROUP DIAL
VOICE MESSAGE
HELP

FIG. 7

BASIC TRANSMISSION PROCEDURE

1. CONFIRM THAT "INSERT DOCUMENT" IS DISPLAYED.
2. PLACE THE DOCUMENT INTO THE ADF (AUTOMATIC DOCUMENT FEEDER) FACE DOWN.
3. SELECT THE DESIRED CONTRAST AND RESOLUTION.
4. ENTER THE NUMBER OF PAGES AND PRESS [YES] , IF REQUIRED.
5. ENTER THE TELEPHONE NUMBER, USING THE KEYPAD OR THE TELEPHONE; OR PRESS DESIRED QUICK DIAL KEY; OR PRESS [SPEED DIAL] + ENTER DESIRED SPEED DIAL NO.
6. PRESS [START] .
7. IF THE LINE IS BUSY, THE NUMBER WILL BE REDIALED. TO REDIAL IMMEDIATELY, PRESS [PAUSE/REDIAL] THEN [START] .

FIG. 8

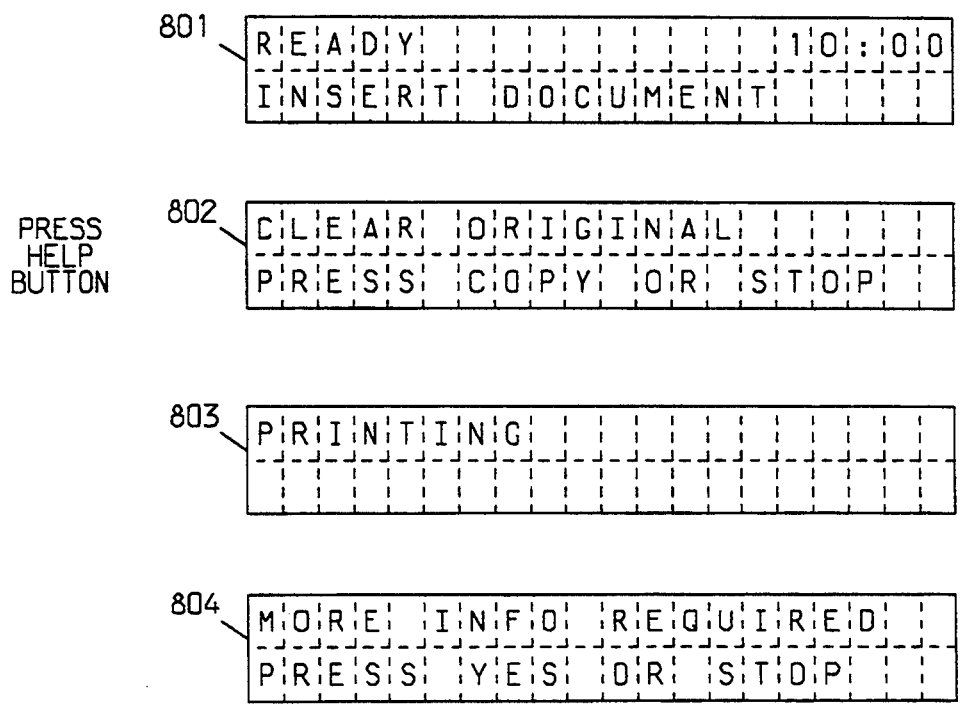

FACSIMILE MACHINE HAVING USER HELP CAPABILITY

This is a continuation of application Ser. No. 07/495,196, filed on Mar. 19, 1990.

TECHNICAL FIELD

The present invention relates to facsimile machines and, more particularly, to the diagnostic capabilities of facsimile machines.

BACKGROUND OF THE INVENTION

All facsimile machines available today have the basic capability of transmitting and receiving facsimile images. Many of today's facsimile machines have added features to the basic capabilities. As a result, facsimile machines are available with numbers of features which can enhance the capability of the machine, make it more useful for different applications, and save the user time and money. Unfortunately for the user, the operation of these features is not always self-evident and the user must refer to the equipment manual for feature operation instructions. If the equipment manual describing the use of these features is not available, the user is left to trial and error. Sometimes the user will seek more information by calling a service number, which may result in maintenance costs to the user. With a lack of information readily available, many facsimile machine features are never used, and the full advantage and utility of the facsimile machine is never realized.

In other situations, errors or problems may occur during the operation of the facsimile machine which may require some user action. Very often the user will require more information to resolve the problem. Typically, the user must search through the equipment manual, if available, or read a brief cryptic message on an LCD display (if the machine has a display capability) to determine and correct the problem. Often, the procedure required to resolve a problem is simple, but unfortunately the user does not have the required information at hand. As a result, customer satisfaction suffers and costly service calls may occur.

SUMMARY OF THE INVENTION

The present invention provides an improved method and apparatus for a facsimile machine which enables a user to access, in real time, information about the various operating modes of the facsimile machine, this and similar types of information being hereinafter collectively referred to as "help" information. For example, the user can access preprogrammed information on the use of features, feature programming, machine errors or other malfunctions of the facsimile machine. My invention recognizes that the printer of the facsimile machine is an ideal means for outputting to the user information regarding the various operating modes and other miscellaneous information of the facsimile machine.

According to my invention, a user help feature is added to a facsimile machine to provide a user with a printed facsimile message including information which is relevant to the operation of the facsimile machine. In one embodiment, if the help feature is activated when the facsimile machine is in a standby operating mode, the user is prompted to request a menu or to select the type of information to be outputted in the facsimile message. If the help feature is activated when the facsimile machine is in an active operating mode (e.g., feature programming, service programming, error condition, and communication modes), the outputted information is selected by the facsimile machine based on the current or previous machine sensor status and/or the present software states. The help feature may be activated by a predesignated push button, access code or by using other methods.

According to another embodiment, my invention is embodied in a communication system which includes a facsimile machine to output user help feature messages. A system user at a system terminal may activate the help feature to obtain a facsimile copy of preprogrammed information associated with various operating modes of the system.

BRIEF DESCRIPTION OF THE DRAWING

In the drawing,

FIG. 3 is a help message state table listing the various help messages which can be accessed by user-entered codes or are retrieved as a function of the software and/or sensor states of the facsimile machine;

FIG. 4 is an example of a detailed help instruction or message to assist the user in clearing an original document feed jam condition in the facsimile machine;

FIG. 5 is an example of a detailed help message to assist the user to set the date and time on a display of the facsimile machine;

FIG. 6 is an example of a feature code list which can be accessed via the help feature;

FIG. 7 is an example of a help message to assist the user to set up the basic transmission mode of the facsimile machine:

FIGS. 8, 9 and 10 show illustrative messages which are displayed by the facsimile machine at various points in the program flow chart of FIG. 2.

DETAILED DESCRIPTION

Figure 1:
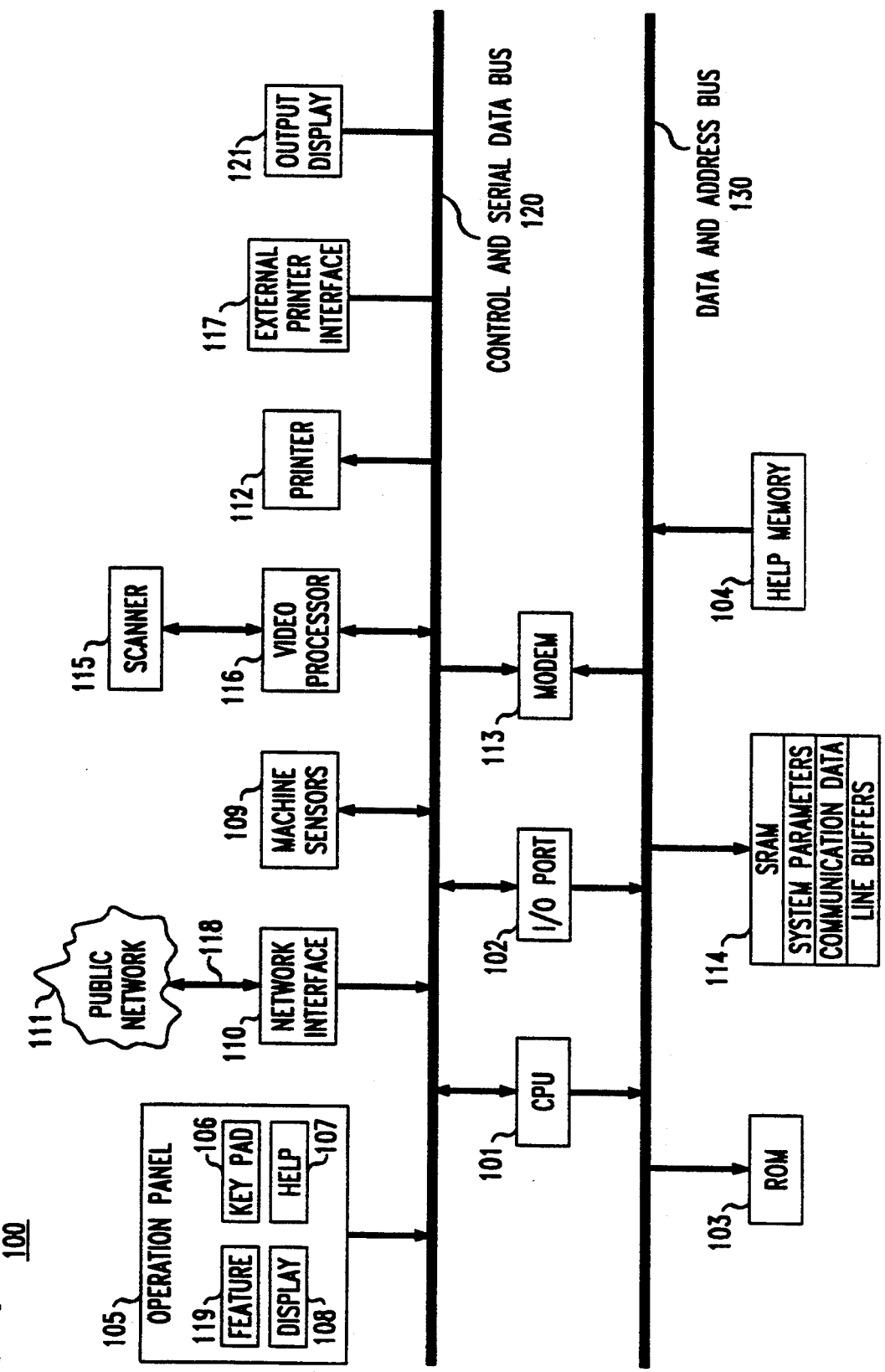
FIG. 1 shows an illustrative block diagram of a facsimile machine useful in describing the present invention.

Shown in FIG. 1 is a block diagram showing the various units of a facsimile (fax) machine 100 useful in describing the present invention. The Central Processing Unit (CPU) 101 operates under program control to control the operations of facsimile machine 100. The CPU 101 controls facsimile machine 100, either directly over control bus and serial data bus 120 or through the I/O Port 102. The Read Only Memory (ROM) 103 contains the system software, or programs utilized by CPU 101 to perform the standard facsimile functions as well as the features and functions of the present invention. The Static Random Access Memory (SRAM) 114 contains memory for storing system parameters, and encoded communication data plus line buffers for passing unencoded data. The help memory 104 is a series of memory files containing information about machine programming operation and diagnostics which is stored as character data or coded facsimile image files. The facsimile image files can contain text or image messages. Character data can be translated to text messages composed of characters contained in a font set or character generator. These files are used to generate the different help instruction messages used by the present invention. CPU 101 communicates, in a well-known manner, with ROM 103, SRAM 114, help memory 104 and modem 113 via Data and Address bus 130.

The Operation Panel (OP) 105 contains key pad buttons 106 and one or more feature access buttons 119, such as the Stop and Copy buttons. Another such feature access button is Help button 107. Activation of these feature buttons and key pad buttons enables the user to enter input commands or requests to CPU 101. The operation panel 105 may include a display 108 to provide output messages to the user typically using a Liquid Crystal Display (LCD). The operation panel 105 may also include one or more Light Emitting Diodes (LED) to display various feature or machine status. Output messages can also be communicated through audible or voice messages transmitted through a speaker or telephone handset.

Machine sensors 109 are devices (e.g., photointerrupt sensors or reflective photosensors) which detect the position of the original document and facsimile paper, paper cutter, and facsimile machine covers and which, depending on their state, can indicate error conditions such as original document jam, thermal copy jams, paper cutter jams or cover open condition.

CPU 101 communicates, in a well-known manner, with operation panel 105, network interface 110, machine sensors 109, video processor 116, printer 112, external printer interface 117 as well as I/O port 102 and modem 113 over control and serial data bus 120.

Facsimile machine 100 generates a hard copy of received facsimile data, i.e., facsimile messages, using printer 112 (e.g., a thermal head printer), in a well-known manner as briefly described hereinafter. The network interface 110 couples facsimile data over one or more facilities connected to a switched network, for example, a public switched telephone network 111. The Printer 112, for example, is used to print facsimile messages or images on a paper medium. These images result from facsimile data which arrives over network 111. In a well-known manner, this facsimile data is coupled through network interface 110, demodulated by the modem 113, passed through the SRAM 114 communication memory, decoded by the CPU 101, stored in the SRAM 114 buffer memory, and sent to printer 112 for printing or, alternatively, output display 121. An external printer (not shown) can be connected via interface 117 to facsimile machine 100.

Facsimile images are transmitted from facsimile machine 100 in the standard manner. The scanner 115 senses image data from the document to be transmitted and converts it to analog signals. The video processor 116 converts these analog facsimile signals to digital facsimile data. These data are processed through the I/O port 102, where they are passed to CPU 101 via the SRAM 114 buffer memory. The CPU 101 sends the data to modem 113 via the SRAM 114 communication memory. The data is sent from modem 113 through network interface 110 to network 111.

Because the operations of the above-mentioned units of the facsimile machine are well known, their operation will not be further described. However, where the operation of any of these units is modified in accordance with the present invention, that unit's operation will be described more completely. Thus, using the figures and description of this specification as a guide, the operations of the present invention should be integrated into the hardware and program structure of the facsimile machine so as to compatibly cooperate with other features and operations of the facsimile machine. In the following description, the first digit of an element's reference number designates the figure where the element is located (e.g., CPU 101 is located in FIG. 1).

Figure 2:
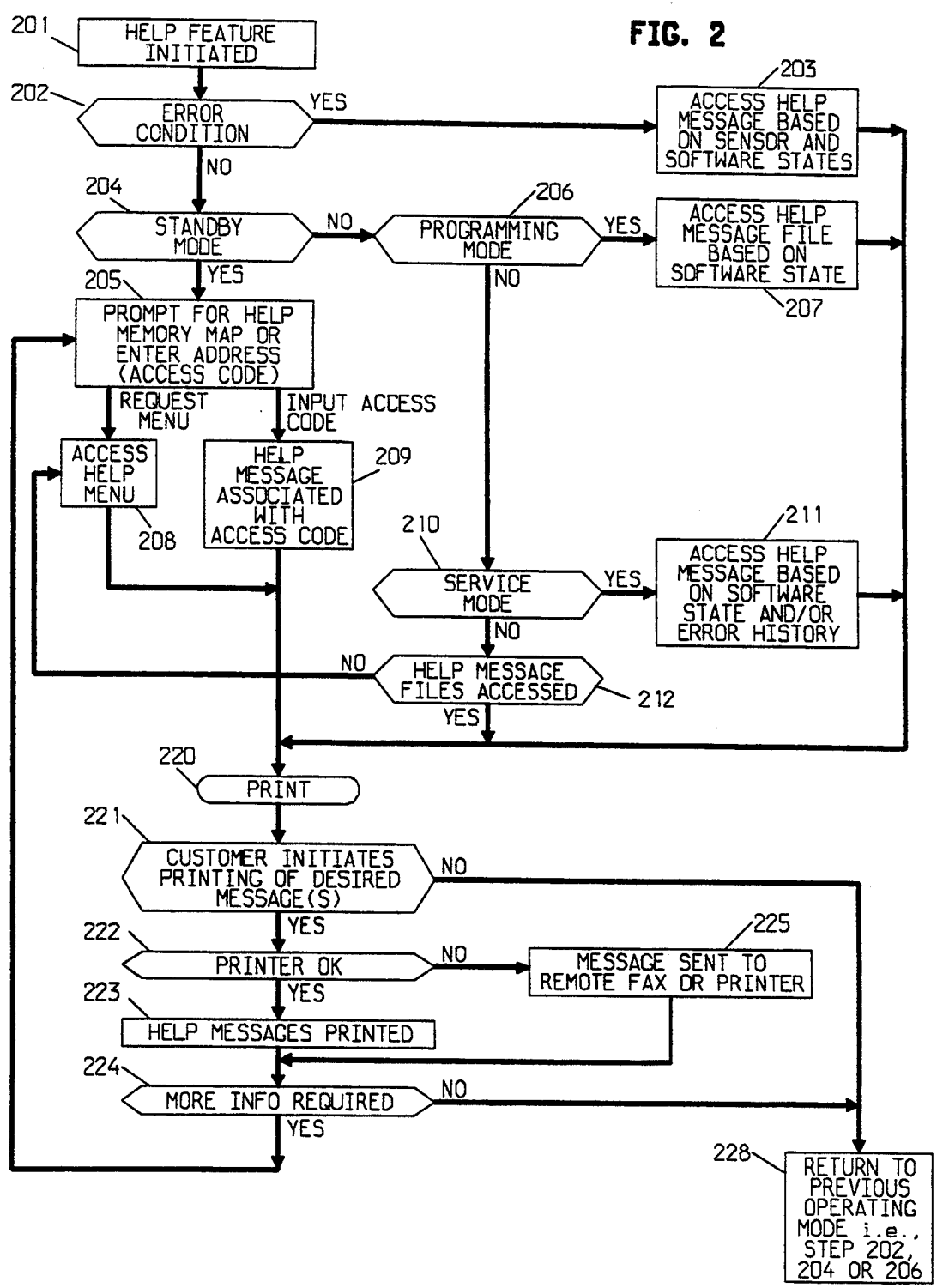
FIG. 2 is a program flow chart describing the operation of the help feature of the present invention.
Figure 9:
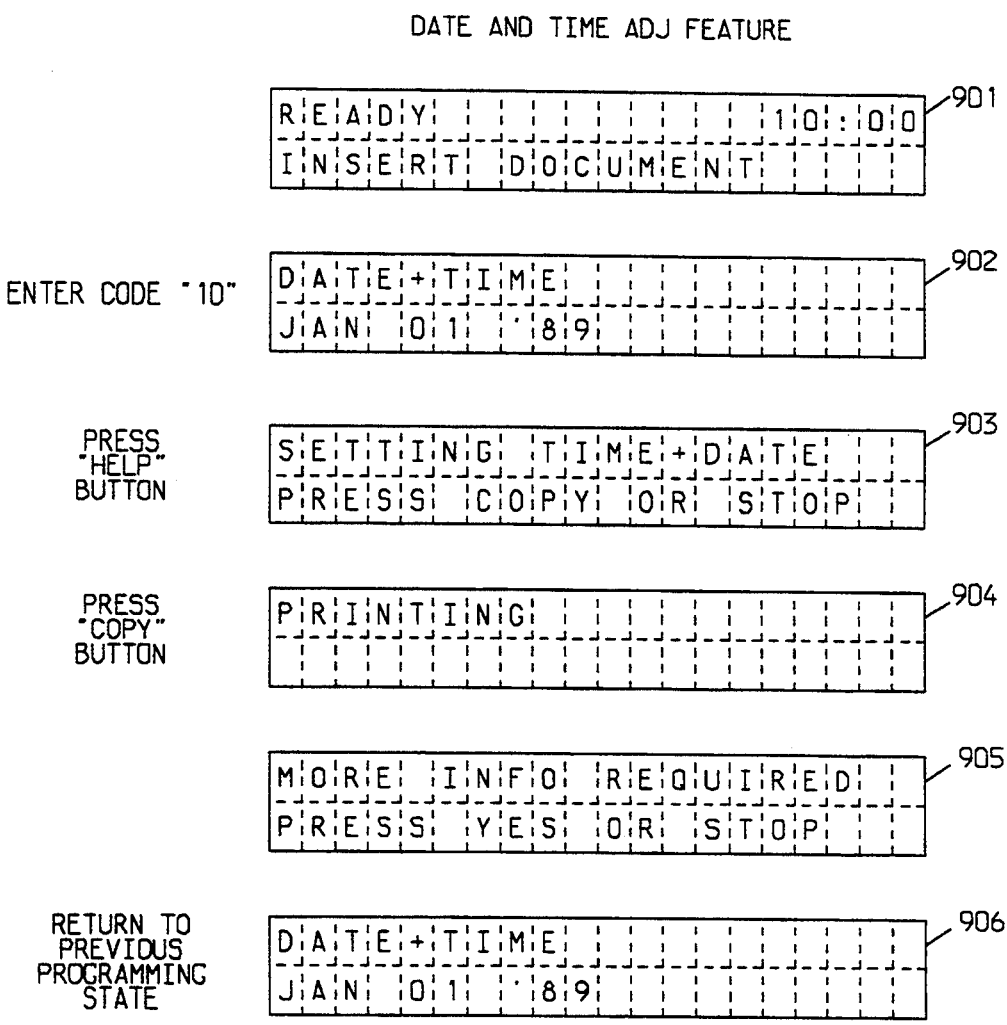
Figure 10:
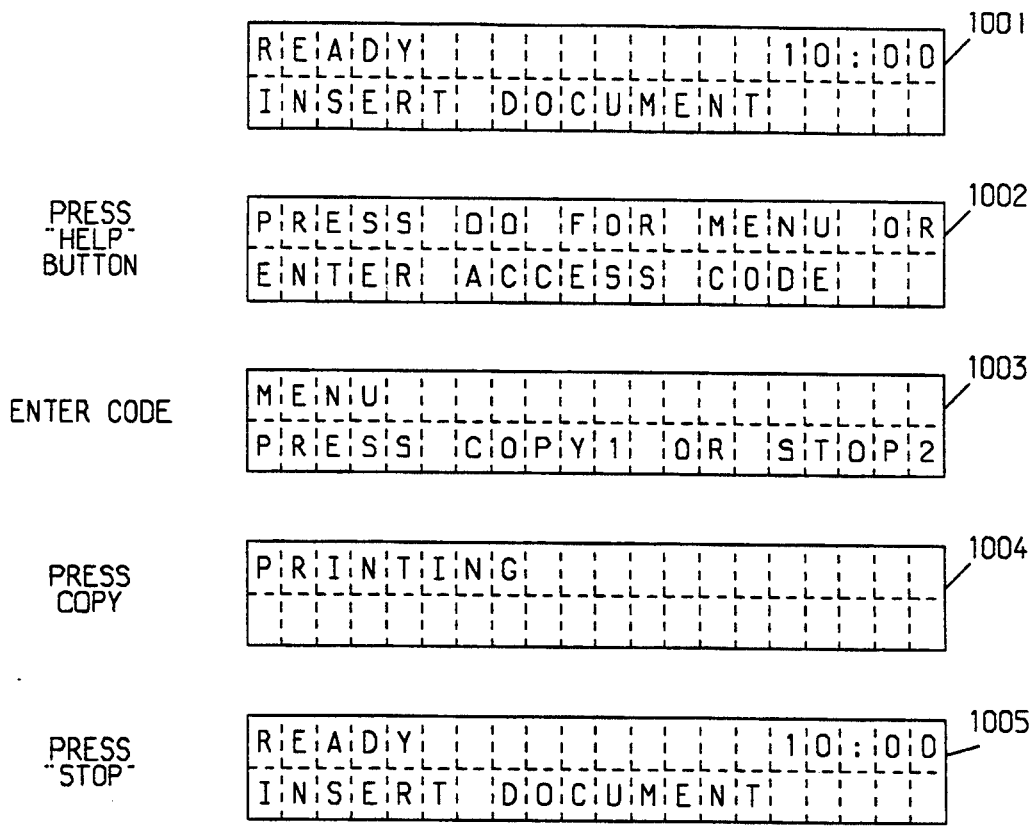

FIG. 2 is a flow chart describing the operation of the present invention. According to the present invention, facsimile machine 100 includes a help feature for providing the user with a hard copy of help information, outputted via the facsimile printer, or transmitted to a remote facsimile terminal, relevant to the existing operating mode of facsimile machine 100 at the time the help feature was activated. Alternatively, the help information may be outputted by an output display 121. If the help feature is activated when the facsimile machine is in an active operating mode (e.g., programming, service, communication or error modes), the outputted information is selected by the facsimile machine based on machine sensor status and/or the present software state. The help feature is activated by a predescribed push button or access code.

When the facsimile machine is turned on, it enters a standby mode. During this standby mode, the display 108 outputs a message such as 801 indicating that the facsimile machine is ready for communication or programming. Assume that the user attempts to send a document and in the course of scanning, the original document jams. To determine the problem and how to clear it, the user, in step 201, initiates or activates the help feature by pressing help button 107. In step 202, CPU 101 checks sensors 109 and the particular software state of the operating program (in ROM 103) to determine if an error condition exists. In our example, the condition of paper sensors (part of 109) coupled with the immediate history of the operation of the feed rollers (part of scanner 115) indicates an original document feed jam. Since an error condition exists, in step 203, CPU 101 accesses the appropriate help instruction or message 321 from section 320 of the FIG. 3 table. CPU 101 then causes the "clear original" message 321 to be displayed on display 108 as shown in 802. CPU 101 may also output an audible alarm to the user.

The help feature then enters the print stage 220. In step 221 the user is prompted, by message 802, to initiate the printing of any help message files. If the user is familiar with how to clear an original document jam in the facsimile machine, he or she can exit from the help feature by pressing a stop button on operation panel 105 (or equivalent operation) and the machine returns to the original state. If, however, the user needs details on how to clear the jam then he or she makes an information request by pressing the copy button or alternate equivalent operation. The CPU 101 then checks, in step 222, if the printer 112 is operational (i.e., paper loaded, no thermal paper jam or cutter error).

If the printer 112 is operational, then, in step 223, a copy of a detailed help message or instructions (similar to that shown in FIG. 4) would be printed for the user. During the printing process the display appears as shown in 803. The help instructions shown in FIG. 4 may be, illustratively, the type of information typically found in the facsimile machine equipment manual. This information may be in textural and/or graphical form. If more information is required by the user, then in step 224 the user is given an option to select the information required. This is shown by the display 804. If the user desires more information, control returns to step 205 where the user can access a help menu (FIG. 3) or enter an access code.

In step 222, if the printer 112 is not operational, then in step 225 CPU 101 sends the information to a previously-designated remote facsimile machine for output or to local printer connected via interface 117. In step 224, if no additional information is required, CPU 101 appropriately returns to the original machine state, prior to help being initiated.

The following paragraphs describe the operation when the help feature is activated after the user has enabled a programming mode. The programming mode can be enabled by pressing program button and the program code or pressing a dedicated "feature" button if provided on operating panel 105.

For example, assume that the user would like to program the facsimile machine 100 by setting the current date and time (e.g., as shown on the display 108). Initially, the display 108 is indicating the standby mode as shown by the "ready" message 901. The user then enables the program mode and the message 902 is displayed. Assume that the user knows that feature code 10 is the code required to initiate the "date and time adjustment" feature (see 601 of FIG. 6). The user then enters feature code 10 via key pad 106 and display 108 outputs the present date and time as shown by message 902. If the user would like to set or change either the displayed date or time or both, but does not know how to change the settings, he or she could press the help button 107.

When the user presses the help button 107, CPU 101 determines, in step 202, that there is no error condition and determines, in step 204, that the machine is not in the standby mode. CPU 101 determines, in step 206, that the machine is in the programming mode and, in step 207, displays message 903 based on the particular state of the software associated with the then active "date and time adjustment" feature 10 and accesses Help memory 104 to obtain user instruction on how to adjust date and time.

The help feature then enters the print stage 220. Steps 221-228 operate as previously described. Shown in FIG. 5 is an illustrative copy of the date and time adjustment instructions which may be outputted to the user via printer 112. During printing, display 108 displays message 904.

The following example describes how a user can access a help message based on entering an access code for a desired message.

Assume that an inexperienced user needs instructions on basic facsimile transmission procedures. The facsimile machine 100 would be in the standby mode 204 with message 1001 being displayed on display 108. When the user presses the help button 107, step 201, CPU 101 checks the machine sensors 109 and software state in step 202, for a prevailing error condition. Since there is no prevailing error condition and since the user is not active in the programming mode, CPU 101 proceeds to step 205. In step 205, CPU 101 prompts the user with message 1002 to determine if a help message menu (FIG. 3) is desired. The user may then request a help menu by entering the code 00 as indicated on the displayed message 1002. The user may also request a specific message by entering an appropriate access code if known (i.e., one of the access codes listed in FIG. 3). Note, there could possibly be other means of requesting specific messages (e.g., depressing combinations of other buttons on operating panel 105).

During step 205, assume our user requests the help menu in step 208. CPU 101 accesses help memory 104 to obtain the help message menu of FIG. 3. CPU 101 then enters the printing stage 221-223. The user is prompted by message 1003 to initiate printing of the help message menu by pressing the copy button (step 221). After the user has perused the copy of the help menu, FIG. 3, the user can seek more information by pressing Yes in response to display 1006 and sees display 1002 (step 224). He or she then selects the access code of the "basic transmission" feature which the user needs. The user locates "basic transmission" feature under the communication modes, section 335 of FIG. 3, and enters access code 40 on key pad 106 to obtain additional help messages or instructions. In response to the user access code selection in step 209, CPU 101 accesses the instructions associated with the selected access code and user sees display 1004. FIG. 7 illustrates the instructions which may be printed for the user using the print subroutine stage 220.

In step 221, the user is prompted by displayed message 1004 to initiate the printing of a help message by pressing the copy button. If the user chooses to stop, by pressing the stop button, the help feature is cancelled at this point and control is returned to the original state, step 228 (in this case standby mode 204). This is indicated by the displayed message 1007.

Assume, however, that the user elects to print the help message. Before printing in step 222, CPU 101 first checks that the printer 112 is functioning. If the printer 112 is not working, the help message could be sent to a remote facsimile machine via the network 111, or to a local printer connected via interface 117 to facsimile machine 100. Assuming that printer 112 is operational, the help message is printed for the user. While the help message is being printed display 108 displays the message 1005. After the help message is printed, the display message 1006 is displayed. The user then has the option, in step 224, of accessing additional help message files or cancelling the operation and returning control to the original state, step 228.

The help features may also be activated during the service programming mode of operation. An illustrative list of service mode features is shown in 330 of FIG. 3. If help feature is enabled while active in service mode programming (206), help message files will be accessed based on the current software state. Specific help messages from 330 can, alternately, be accessed by directly entering the associated access code (205,206) as described above.

In one possible embodiment, specific diagnostic messages, (e.g., see section 330), can be accessed automatically based on the previous error history of the machine, or current hardware real function.

FIG. 3 shows an illustrative list of help message files that comprise the help menu map. Help message files may have both an associated access code and "condition". These specific conditions are based on combinations of machine software and sensor 109 states. Help messages or files could be accessed directly by access code 301, or automatically based on the condition or state 302 of the machine when the help feature is initiated. The programming mode files 310, error condition mode files 320 and service mode files 330 and communication mode files 335 are examples of files which can be accessed by codes or machine (software and sensor) conditions. The programming mode files 310 include a listing of various features which can be programmed into the machine. The programming mode files may include the illustrative list of machine features shown in FIG. 6.

Similarly, the error condition files 320 contain information on various machine errors or malfunction conditions and procedures for clearing them. Thus, each of the error condition files 320, including our previous original document jam example, can be accessed directly using access codes and by machine conditions.

Additionally, service mode files 330 which include information on service programming and maintenance procedures, could also be accessed via access codes or by machine conditions (including previous error history or current hardware malfunction). The communication mode files 335 could be similarly accessed.

The miscellaneous information files 340 may include the listing of machine pans, part numbers, and ordering information; or information on how to clean and maintain the facsimile machine. These files 340 would include information not associated with a machine software sensor state.

Each of the operating modes 310-340 may also contain sub-menus of other associated files. For example, the file on Polling (in programming files 310) may, itself, contain a menu of associated sub-files (e.g., Polling Reception, Turnaround Polling, etc.) showing the access codes and how to print instructions on these sub-files.

Figure 11:
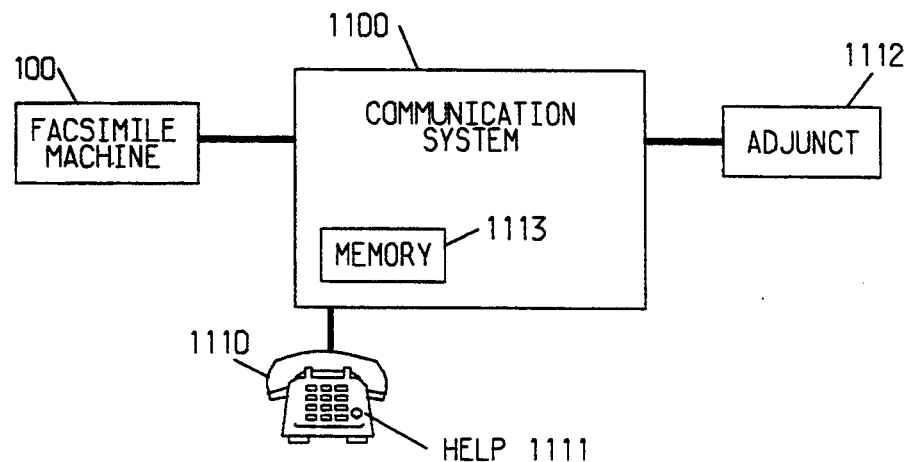
FIG. 11 shows an alternate embodiment of the present invention where a facsimile machine is connected to a communication system and is used to provide a user help feature to assist in operating or diagnosing malfunctions of the key telephone system.

FIG. 11 shows a possible embodiment of the invention in a communication system, e.g., a key telephone system. In such an embodiment, the present invention may be used to access help messages associated with the operation or programming of the communication system 1110. The help messages could be stored in the facsimile machine 100 or in a memory 1113 of the communication system 1100, or in an adjunct 1112 to system 1100. The help feature may, illustratively, be initiated by entering an access code or pressing a button 1111 on a telephone station set 1110. In response to the received help signal, CPU 1115 of system 1100 selects and outputs a facsimile message to facsimile machine 100. The facsimile machine 100 may be directly connected to the telephone system 1100, or could be connected via network 111.

Thus, in accordance with the present invention and in a manner similar to that previously described, a user at station set 1110 could initiate the help feature and obtain facsimile messages containing preprogrammed information about communication system 1100, e.g., information on system features, programming of features, communication system errors or other malfunctions of the communication system. Alternately, these messages could be obtained via an external printer device connected to the telephone system 1114.

Thus, what has been described is one embodiment of the invention. Other methods, sequences or arrangements can be used to implement the present invention by those skilled in the art without departing from the spirit and scope of the present invention.

I claim:

1. A facsimile apparatus connectable to a communication facility, comprising means for outputting a facsimile transmission received over said facility as a hard copy, means for displaying an information message during one of a plurality of different operating modes of said facsimile apparatus, means for inputting a user input to said facsimile apparatus, means for generating a help signal in response to a user input occurring during a display of a first message by said displaying means, said help signal not being transmitted over said facility, memory means for storing programs for controlling said plurality of different operating modes of said facsimile apparatus, said memory means also storing preprogrammed help information as a plurality of information messages, each of said information messages being associated with and describing operation aspects of a different operating mode of said facsimile apparatus; and control means for controlling tile different operating modes of said facsimile apparatus and responsive to said help signal for displaying a second message via said displaying means to provide help information on said operating mode of said facsimile apparatus and requesting an additional user input, said control means responsive to said additional user input for outputting a third information message in hard copy form to the user, said third message providing more specific help information on said operating mode of said facsimile apparatus.

2. The facsimile apparatus of claim 1 wherein said inputting means is a push button.

3. The facsimile apparatus of claim 1 wherein said inputting means includes means for dialing a communication connection over a facility connected to a second facsimile apparatus and wherein said help signal is generated from a predesignated activation code inputted by said user using said dialing means.

4. The facsimile apparatus of claim 1 wherein said operating mode is a service mode, and said outputted third information message describes procedures of said service mode of said facsimile apparatus.

5. The facsimile apparatus of claim 1 wherein said operating mode is a programming mode, and said outputted third information message describes features of said programming mode of said facsimile apparatus.

6. The facsimile apparatus of claim 1 wherein said operating mode is an error mode, and said outputted third information message describes conditions of said error mode of said facsimile apparatus.

7. The facsimile apparatus of claim 1 wherein said operating mode is a communication mode, and said outputted third information message describes features of said communication mode of said facsimile apparatus.

8. The facsimile apparatus of claim 1 wherein said operating mode performs one or more functions under program control and said control means selects one of said plurality of information messages in response to the particular function being performed by said program when said help signal is generated.

9. The facsimile apparatus of claim 1 wherein the preprogrammed help information includes graphical information.

10. The facsimile apparatus of claim 1 wherein the preprogrammed help information includes character data.

11. A communication system comprising a controller, a plurality of terminals connected thereto and a remote facsimile apparatus, said system further comprising at said facsimile apparatus, means for outputting a received facsimile message in hard copy form, in at least one of said plurality of terminals, means responsive to a user input for generating and transmitting a help signal to said controller during an operating mode at said at least one of said plurality of terminals, and at said controller, memory means for storing preprogrammed help information as a plurality of information messages, each of said information messages being associated with and describing a different operating mode at said at least one of said plurality of terminals, control means responsive to said help signal for outputting via said outputting means, in hard copy form, only one of said information messages to said user, said only one of said information messages outputted being selected by said control means in accordance with the operating mode of said system when said help signal is generated.

12. The system of claim 11 wherein said generating means is a push button.

13. The system of claim 11 wherein said message includes information selected from said preprogrammed help information in response to a second input from said user.

14. The system of claim 11 wherein the preprogrammed help information includes graphical information.

15. A communication system comprising a controller, a plurality of terminals connected thereto and a remote facsimile apparatus, said system further comprising at said facsimile apparatus, means for outputting a received facsimile transmission; and in at least one of said plurality of terminals;

means responsive to a user input for generating and transmitting a help signal to said controller during an operating mode at said at least one of said plurality of terminals; and at said controller memory means for storing preprogrammed help information as a plurality of information messages, at least one of said information messages being associated with and describing operation aspects of an operating mode of said system, control means responsive to said help signal for outputting via said outputting means in hard copy form only one of said information messages to said user, said only one of said information messages outputted being selected by said control means in accordance with the operating mode at said at least one of said plurality of terminals when said help signal is generated, and wherein at said at least one of said plurality of terminals, said generating means includes signaling means for dialing a communication connection to said controller, and wherein said help signal is generated from a predesignated activation code inputted by said user using said signaling means.

16. The system of claim 15 wherein said first operating mode performs one or more functions under program control and said control means selects one of said plurality of information messages in response to the particular function being performed by said program when said help signal is generated.

17. The system of claim 15 including sensor means for detecting an operating condition of said system and wherein said control means selects information for said message from said preprogrammed help information in response to an input from said sensor means.

18. A method of operating a communication system comprising a controller, a plurality of terminals connected thereto, with means for generating a help signal in response to a user input occurring during an operating mode of said system, a remote facsimile apparatus having an output means for outputting in hard-copy form a received facsimile transmission to a user, and memory means for storing help information messages associated with and describing operation aspects of different operating modes of said system, said method comprising the steps of at at least one of said terminals, generating and transmitting a help signal to said controller in response to a user input occurring during a first operating mode of said system, and at said controller and in response to said help signal, outputting via said outputting means, in hard copy form, only one of said information messages to said user, said only one of said information messages outputted being selected by said control means in accordance with the operating mode of the system when said help signal is generated.

19. A communication system comprising a controller, a plurality of terminals connected thereto and a remote facsimile apparatus connectable over a facility to said system, said system further comprising at said facsimile apparatus, means for outputting a received facsimile transmission; and in at least one of said plurality of terminals, means responsive to a user input for generating and transmitting a help signal to said controller during a first operating mode of said system; and at said controller memory means for storing preprogrammed help information as a plurality of information messages, at least one of said information messages being associated with and describing operation aspects of an operating mode of said system, control means responsive to said help signal for outputting via said outputting means in hard copy form only one of said information messages to said user, said only one of said information messages outputted being selected by said control means in accordance with the operating mode of said system when said help signal is generated, and wherein at said at least one of said plurality of terminals, said generating means includes signaling means for dialing a communication connection to said controller, and wherein said help signal is generated from a predesignated activation code inputted by said user using said signaling means.

20. A method of operating a facsimile apparatus, comprising the steps of storing programs for controlling said plurality of different operating modes of said facsimile apparatus and preprogrammed help information as a plurality of information messages, each of said information messages being associated with and describing operation aspects of a different operating mode of said facsimile apparatus;

controlling the different operating modes of said facsimile apparatus;

displaying an information message during one of a plurality of different operating modes of said facsimile apparatus;

inputting a user input to said facsimile apparatus;

generating a help signal in response to said user input occurring during a display of a first message, said help signal not being transmitted over said facility;

in response to said help signal, displaying a second message to provide help information on said operating mode of said facsimile apparatus and requesting an additional user input; and in response to said additional user input, printing a third information message in hard copy form to the user, said third message providing more specific help information on said operating mode of said providing more specific information on said operating mode of said facsimile apparatus.

* * * * *